(12) United States Patent
Wang et al.

(10) Patent No.: US 12,483,140 B2
(45) Date of Patent: Nov. 25, 2025

(54) SWITCHING REGULATOR AND CONTROL CIRCUIT THEREOF AND QUICK RESPONSE METHOD

(71) Applicant: Richtek Technology Corporation, Hsinchu (TW)

(72) Inventors: Chien-Hui Wang, New Taipei (TW); Chieh-Min Feng, New Taipei (TW)

(73) Assignee: Richtek Technology Corporation, Hsinchu (TW)

( * ) Notice: Subject to any disclaimer, the term of this patent is extended or adjusted under 35 U.S.C. 154(b) by 258 days.

(21) Appl. No.: 18/451,074

(22) Filed: Aug. 16, 2023

(65) Prior Publication Data

US 2024/0372485 A1    Nov. 7, 2024

(30) Foreign Application Priority Data

May 4, 2023   (TW) .................................. 112116614

(51) Int. Cl.
*H02M 3/158*    (2006.01)

(52) U.S. Cl.
CPC ....... *H02M 3/1584* (2013.01); *H02M 3/1586* (2021.05)

(58) Field of Classification Search
CPC ......................... H02M 3/1584; H02M 3/1586
See application file for complete search history.

(56) References Cited

U.S. PATENT DOCUMENTS

| | | | | |
|---|---|---|---|---|
| 2006/0152205 A1* | 7/2006 | Tang | .................... | H02M 3/1584 323/284 |
| 2012/0262136 A1* | 10/2012 | Nien | .................... | H02M 3/1584 323/272 |
| 2015/0002112 A1* | 1/2015 | Tang | .................... | H02M 3/1584 323/271 |

* cited by examiner

Primary Examiner — Alex Torres-Rivera
(74) Attorney, Agent, or Firm — Huan-Yi Lin

(57) ABSTRACT

A switching regulator includes: a phase number signal generator circuit which includes: a current sensing signal differentiator circuit for performing differentiation on a current sensing signal to generate a current differentiation signal; a current sense signal filter circuit for filtering the current sense signal to generate a filtered current signal according to the current differentiation signal; and a phase number decision circuit for deciding a phase number signal according to the filtered current signal; and an AQR signal generator circuit which includes: a voltage sensing signal differentiator circuit for performing differentiation on a voltage sensing signal to generate a voltage differentiation signal; and plural comparator circuits for comparing the voltage differentiation signal with plural AQR threshold signals to generate plural AQR comparison signals, so as to generate an AQR signal to control an operation signal generator circuit to perform an adaptive quick response procedure.

22 Claims, 8 Drawing Sheets

SWITCHING REGULATOR AND CONTROL CIRCUIT THEREOF AND QUICK RESPONSE METHOD

CROSS REFERENCE

The present invention claims priority to TW 112116614 filed on May 4, 2023.

BACKGROUND OF THE INVENTION

Field of Invention

The present invention relates to a switching regulator; particularly, it relates to such switching regulator capable of preventing extremely long adaptive quick response (AQR) period. The present invention also relates to a control circuit and a quick response method, both of which are for use in such switching regulator.

Description of Related Art

FIG. 1 illustrates prior art characteristic curves depicting relationships of conversion efficiency versus load current for different activated phase numbers. As shown in FIG. 1, in the conventional multiphase voltage converter, each activated phase number has its corresponding conversion efficiency curve. Theoretically, if the conventional multiphase voltage converter can automatically switch different activated phase numbers based upon the load current, the conventional multiphase voltage converter can always operate with a highest efficiency. Nevertheless, in a practical implementation for the conventional multiphase voltage converter, there are some undesirable problems. For example, because the conventional multiphase voltage converter is limited to sense current of the inductors, a delay will undesirably exist between such sensed inductor current and an actual load current and a difference will undesirably exist between such sensed inductor current and the practical load current, thus unwantedly resulting in an undershoot of an output voltage, which does not comply with a corresponding specification. To avoid the aforementioned problem from occurring, the most prevalent solution lies in that: once an undershoot of an output voltage is detected to possibly occur, all phases (i.e., maximum phase number) of the power stage circuit are promptly turned ON, which is usually referred to as "quick response". The prior art quick response scheme for preventing undershoot of an output voltage has following drawbacks that: after all phases of the power stage circuit are promptly turned ON, it will probably take several hundreds of microseconds (μs) to reduce a certain activated phase number to an activated phase number having the highest efficiency such that the output voltage is ensured to have become stable.

Taking a central processing unit (CPU) as an exemplary load of the conventional multiphase voltage converter, the load current level changes so quick, which makes it almost impossible for the conventional power stage circuit to stay at the activated phase number having the highest efficiency. Instead, the conventional power stage circuit is likely to always operate with a maximum activated phase number. In other words, the conventional multiphase voltage converter has an extremely long AQR (adaptive quick response) period, which leads the conventional multiphase voltage converter not being able to operate with the highest efficiency.

SUMMARY OF THE INVENTION

From one perspective, the present invention provides a switching regulator, comprising: a plurality of power stage circuits, wherein each power stage circuit includes at least one power switch and is configured to operably operate the at least one power switch in accordance with a corresponding switch operation signal, so as to convert an input voltage to an output voltage; and a control circuit including: an operation signal generator circuit, which is coupled to the plurality of power stage circuits, wherein the operation signal generator circuit is configured to operably generate the switch operation signal according to the output voltage, a phase number signal and an adaptive quick response (AQR) signal; a phase number signal generator circuit, which is coupled to the operation signal generator circuit, wherein the phase number signal generator circuit is configured to operably generate the phase number signal based upon a current sensing signal correlated with a total current flowing through the plurality of power stage circuits, wherein the phase number signal generator circuit includes: a current sensing signal differentiator circuit, which is configured to operably perform differentiation on the current sensing signal to generate a current differentiation signal; a current sensing signal filter circuit, which is configured to operably filter the current sense signal to generate a filtered current signal according to the current differentiation signal; and a phase number decision circuit, which is configured to operably decide, adaptively, a number of the plurality of power stage circuits required to be activated according to the filtered current signal, so as to generate the phase number signal; and an AQR (adaptive quick response) signal generator circuit, which is coupled to the operation signal generator circuit, wherein the AQR signal generator circuit is configured to operably generate the AQR signal according to the output voltage, wherein the AQR signal generator circuit includes: a voltage sensing signal differentiator circuit, which is configured to operably perform differentiation on a voltage sensing signal related to the output voltage to generate a voltage differentiation signal; and a plurality of comparator circuits, which are coupled to the voltage sensing signal differentiator circuit, wherein the plurality of comparator circuits are configured to operably compare the voltage differentiation signal with a plurality of AQR threshold signals, so as to generate a plurality of AQR comparison signals, thus generating the AQR signal for controlling the operation signal generator circuit to perform an adaptive quick response procedure.

From another perspective, the present invention provides a control circuit for use in a switching regulator, wherein the control circuit is configured to operably convert an input voltage to an output voltage; the control circuit comprising: an operation signal generator circuit, which is coupled to the plurality of power stage circuits, wherein the operation signal generator circuit is configured to operably generate the switch operation signal according to the output voltage, a phase number signal and an adaptive quick response (AQR) signal; a phase number signal generator circuit, which is coupled to the operation signal generator circuit, wherein the phase number signal generator circuit is configured to operably generate the phase number signal based upon a current sensing signal correlated with a total current flowing through the plurality of power stage circuits, wherein the phase number signal generator circuit includes: a current sensing signal differentiator circuit, which is configured to operably perform differentiation on the current sensing signal to generate a current differentiation signal; a current sensing signal filter circuit, which is configured to operably filter the current sense signal to generate a filtered current signal according to the current differentiation signal; and a phase number decision circuit, which is configured to operably decide, adaptively, a number of the plurality of power stage circuits required to be activated according to the filtered current signal, so as to generate the phase number signal; and an AQR (adaptive quick response) signal generator circuit, which is coupled to the operation signal generator circuit, wherein the AQR signal generator circuit is configured to operably generate the AQR signal according to the output voltage, wherein the AQR signal generator circuit includes: a voltage sensing signal differentiator circuit, which is configured to operably perform differentiation on a voltage sensing signal related to the output voltage to generate a voltage differentiation signal; and a plurality of comparator circuits, which are coupled to the voltage sensing signal differentiator circuit, wherein the plurality of comparator circuits are configured to operably compare the voltage differentiation signal with a plurality of AQR threshold signals, so as to generate a plurality of AQR comparison signals, thus generating the AQR signal for controlling the operation signal generator circuit to perform an adaptive quick response procedure.

In one embodiment, in the adaptive quick response procedure, the operation signal generator circuit is configured to operably adjust each switch operation signal according to the AQR signal, so that the plurality of power stage circuits are controlled to be simultaneously ON for an AQR period.

In one embodiment, the current sensing signal filter circuit is configured to operably enable one of a rising signal filter and a falling signal filter, of the current sensing signal filter circuit, according to the current differentiation signal, so as to filter the current sensing signal, thereby generating the filtered current signal, wherein the rising signal filter is different from the falling signal filter in at least one of following parameters: (1) a bandwidth parameter; (2) a magnitude parameter; and/or (3) a ripple parameter.

In one embodiment, when the current differentiation signal is greater than zero, the current sensing signal filter circuit enables the rising signal filter, wherein the bandwidth parameter of the rising signal filter is broader than the bandwidth parameter of the falling signal filter, such that a bandwidth of the rising signal filter is broader than a bandwidth of the falling signal filter.

In one embodiment, the current sensing signal filter circuit is configured to operably decide a parameter of the current sensing signal filter circuit in accordance with a filter parameter calibration procedure, wherein the filter parameter calibration procedure includes following steps: step (1): coupling a test load to the output voltage; step (2): subsequent to the step (1), setting an initial value of the parameter of the current sensing signal filter circuit based upon a parameter of the power stage circuit and an inductor current device parameter, wherein the parameter of the power stage circuit includes: a parameter of a device in the power stage circuit, and wherein the inductor current device parameter includes: a parameter of a device in an inductor current sensing circuit, which is configured to operably sense an inductor current flowing through the power stage circuit; step (3): subsequent to the step (2) or step (6), controlling the test load to generate at least one predetermined waveform having a characteristic of step transient; step (4): subsequent to the step (3), measuring a transient state waveform generated by the current sensing signal filter circuit; step (5): subsequent to the step (4), determining whether a difference between the transient state waveform and the at least one predetermined waveform is smaller than a predetermined current sensing range; the step (6): subsequent to the step (5), when the difference between the transient state waveform and the at least one predetermined waveform is not smaller than the predetermined current sensing range, adjusting the parameter of the current sensing signal filter circuit and returning to the step (3); and step (7): subsequent to the step (5), when the difference between the transient state waveform and the at least one predetermined waveform is smaller than the predetermined current sensing range, setting the parameter of the current sensing signal filter circuit according to the parameter of the power stage circuit and the inductor current device parameter at present time.

In one embodiment, the AQR signal generator circuit is configured to operably decide a parameter of the AQR signal generator circuit in accordance with an AQR parameter calibration procedure, wherein the AQR parameter calibration procedure includes following steps: step (8): subsequent to the step (7) or step (10), testing an AC load line of at least one frequency; step (9): subsequent to the step (8), determining whether a difference between the voltage sensing signal and an AQR specification is smaller than a predetermined voltage sensing range; the step (10): subsequent to the step (9), when the difference between the voltage sensing signal and the AQR specification is not smaller than the predetermined voltage sensing range, adjusting the plurality of AQR threshold signals and/or updating two time points respectively selected from a plurality of AQR comparison signal rising time points and a plurality of AQR comparison signal falling time points, so that the updated two time points respectively function as an AQR rising time point and an AQR falling time point and returning to the step (8); and step (11): subsequent to the step (9), when the difference between the voltage sensing signal and the AQR specification is smaller than the predetermined voltage sensing range, setting a parameter of the AQR signal generator circuit at present time via the plurality of AQR threshold signals at present time and/or via the AQR rising time point and the AQR falling time point, both of which are respectively selected from the plurality of AQR comparison signal rising time points and the plurality of AQR comparison signal falling time points at present time, and subsequently terminating the AQR parameter calibration procedure.

In one embodiment, the phase number decision circuit is configured to operably perform table lookup on a corresponding filtered current signal according to relationships of conversion efficiency versus load current with various phase numbers, so as to adaptively decide the number of the plurality of power stage circuits required to be activated, thereby generating the phase number signal.

In one embodiment, the current sensing signal filter circuit includes: a low-pass filter, a band-pass filter or a band-stop filter.

From yet another perspective, the present invention provides a quick response method for use in a switching regulator, wherein the quick response method is configured to operably enhance response capability for instant change of a load; the quick response method comprising following steps: performing differentiation on a current sensing signal correlated with a total current flowing through a plurality of power stage circuits in the switching regulator to generate a current differentiation signal; filtering the current sense signal and generating a filtered current signal according to the current differentiation signal; adaptively deciding a number of the plurality of power stage circuits required to be activated according to the filtered current signal, so as to generate a phase number signal; performing differentiation on a voltage sensing signal related to an output voltage to generate a voltage differentiation signal; comparing the voltage differentiation signal with a plurality of adaptive quick response (AQR) threshold signals, so as to generate a plurality of AQR comparison signals, thus generating the AQR signal for triggering an adaptive quick response procedure; and in the adaptive quick response procedure, an operation signal generator circuit in the switching regulator is configured to operably adjust each switch operation signal according to the AQR signal, so that the plurality of power stage circuits are controlled to be simultaneously ON for an AQR period.

In one embodiment, the quick response method further comprises following steps: enabling one of a rising signal filter and a falling signal filter of the current sensing signal filter circuit according to the current differentiation signal, so as to filter the current sensing signal, thereby generating the filtered current signal, wherein the rising signal filter is different from the falling signal filter in at least one of following parameters: (1) a bandwidth parameter; (2) a magnitude parameter; and/or (3) a ripple parameter.

In one embodiment, the quick response method further comprises following steps: when the current differentiation signal is greater than zero, enabling the rising signal filter, wherein the bandwidth parameter of the rising signal filter is broader than the bandwidth parameter of the falling signal filter, such that a bandwidth of the rising signal filter is broader than a bandwidth of the falling signal filter.

In one embodiment, the quick response method further comprises following steps: deciding a parameter of a current sensing signal filter circuit in the switching regulator in accordance with a filter parameter calibration procedure, wherein the filter parameter calibration procedure includes following steps: step (1): coupling a test load to the output voltage; step (2): subsequent to the step (1), setting an initial value of the parameter of the current sensing signal filter circuit based upon a parameter of the power stage circuit and an inductor current device parameter, wherein the parameter of the power stage circuit includes: a parameter of a device in the power stage circuit, and wherein the inductor current device parameter includes: a parameter of a device in an inductor current sensing circuit, which is configured to operably sense an inductor current flowing through the power stage circuit; step (3): subsequent to the step (2) or step (6), controlling the test load to generate at least one predetermined waveform having a characteristic of step transient;

step (4): subsequent to the step (3), measuring a transient state waveform generated by the current sensing signal filter circuit; step (5): subsequent to the step (4), determining whether a difference between the transient state waveform and the at least one predetermined waveform is smaller than a predetermined current sensing range; the step (6): subsequent to the step (5), when the difference between the transient state waveform and the at least one predetermined waveform is not smaller than the predetermined current sensing range, adjusting the parameter of the current sensing signal filter circuit and returning to the step (3); and step (7): subsequent to the step (5), when the difference between the transient state waveform and the at least one predetermined waveform is smaller than the predetermined current sensing range, setting the parameter of the current sensing signal filter circuit according to the parameter of the power stage circuit and the inductor current device parameter at present time.

In one embodiment, the quick response method further comprises following steps: deciding a parameter of an AQR signal generator circuit in the switching regulator in accordance with an AQR parameter calibration procedure, wherein the AQR parameter calibration procedure includes following steps: step (8): subsequent to the step (7) or step (10), testing an AC load line of at least one frequency; step (9): subsequent to the step (8), determining whether a difference between the voltage sensing signal and an AQR specification is smaller than a predetermined voltage sensing range; the step (10): subsequent to the step (9), when the difference between the voltage sensing signal and the AQR specification is not smaller than the predetermined voltage sensing range, adjusting the plurality of AQR threshold signals and/or updating two time points respectively selected from a plurality of AQR comparison signal rising time points and a plurality of AQR comparison signal falling time points, so that the updated two time points respectively function as an AQR rising time point and an AQR falling time point and returning to the step (8); and step (11): subsequent to the step (9), when the difference between the voltage sensing signal and the AQR specification is smaller than the predetermined voltage sensing range, setting a parameter of the AQR signal generator circuit at present time via the plurality of AQR threshold signals at present time and/or via the AQR rising time point and the AQR falling time point, both of which are respectively selected from the plurality of AQR comparison signal rising time points and the plurality of AQR comparison signal falling time points at present time, and subsequently terminating the AQR parameter calibration procedure.

In one embodiment, the quick response method further comprises following steps: performing table lookup on a corresponding filtered current signal according to relationships of conversion efficiency versus load current with various phase numbers, so as to adaptively decide the number of the plurality of power stage circuits required to be activated, thereby generating the phase number signal.

To overcome the drawbacks in the prior art, the present invention proposes a switching regulator capable of preventing extremely long AQR (adaptive quick response) period. The present invention also relates to a control circuit and a quick response method, both of which are for use in such switching regulator.

Advantage of the present invention includes: that, the present invention can prevent extremely long AQR (adaptive quick response) period from being produced, thus desirably enhancing efficiency.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 2:
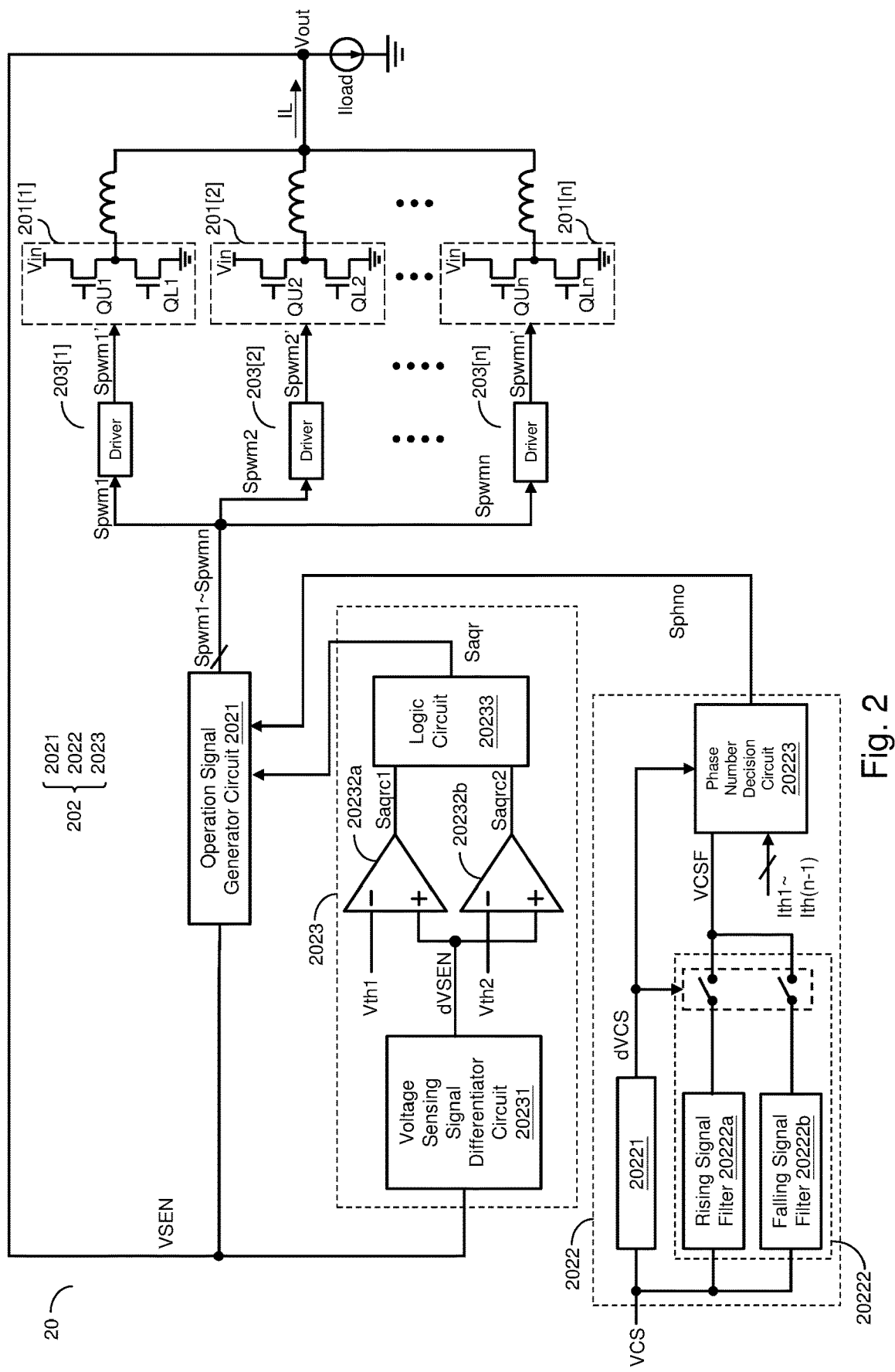
FIG. 2 shows a block diagram of a switching regulator according to an embodiment of the present invention.

FIG. 2 shows a block diagram of a switching regulator according to an embodiment of the present invention. As shown in FIG. 2, the switching regulator 20 of the present invention comprises: plural power stage circuits 201[1]~201[n] and a control circuit 202. Each power stage circuit (i.e., power stage circuit 201[1], 201[2], . . . or 201[n]) is configured to operably operate a corresponding power switch (i.e., power switch QU1 or QL1, power switch QU2 or QL2, . . . , power switch QUn or QLn) in accordance with a corresponding switch operation signal (i.e., switch operation signal Spwm1, Spwm2 . . . or Spwmn), so as to convert an input voltage Vin to an output voltage Vout, wherein n denotes a positive integer greater than or equal to two. The control circuit 202 includes: an operation signal generator circuit 2021, a phase number signal generator circuit 2022 and an adaptive quick response (AQR) signal generator 2023. The operation signal generator circuit 2021 is coupled to the plural power stage circuits 201[1]~201[n] via plural corresponding drivers 203[1]~203[n] (i.e., for example, the operation signal generator circuit 2021 is coupled to the power stage circuits 201[1] via the corresponding driver 203[1], the operation signal generator circuit 2021 is coupled to the power stage circuits 201[2] via the corresponding driver 203[2], . . . , and the operation signal generator circuit 2021 is coupled to the power stage circuits 201[n] via the corresponding driver 203[n]). Under this configuration arrangement of the operation signal generator circuit 2021, the operation signal generator circuit 2021 is configured to operably generate the switch operation signals (i.e., Spwm1, Spwm2, . . . , and Spwmn) according to the output voltage Vout, a phase number signal Sphno and an adaptive quick response (AQR) signal Saqr.

The phase number signal generator circuit 2022 is coupled to the operation signal generator circuit 2021, and is configured to operably generate the phase number signal Sphno based upon a current sensing signal VCS correlated with a total current flowing through the plural power stage circuits 201[1]~201[n].

Figure 1:
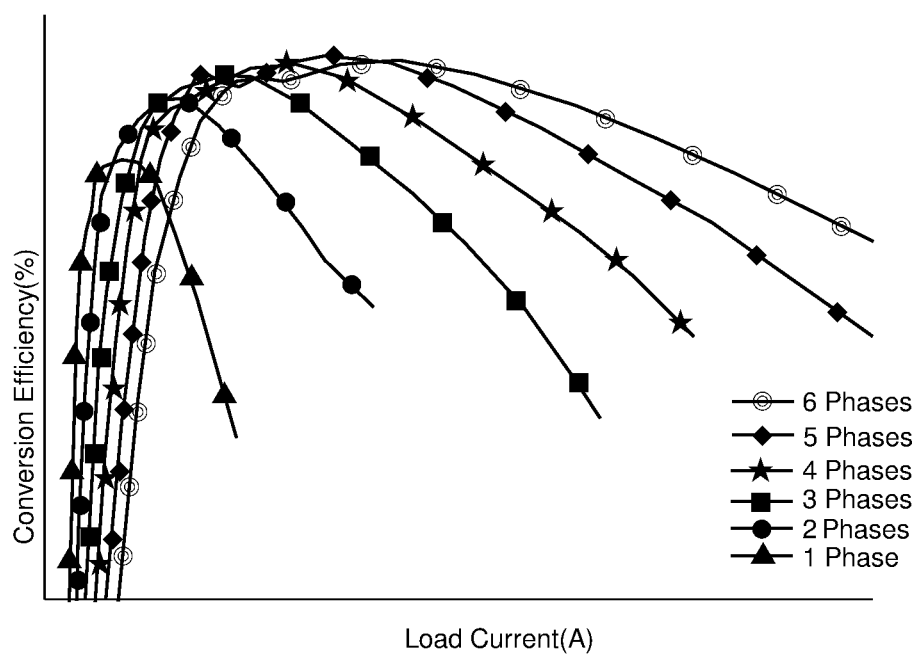
FIG. 1 illustrates a prior art curve diagrams depicting relationships of conversion efficiency versus load current with different activated phase numbers, under which a conventional multiphase voltage converter is being operated.

The phase number signal generator circuit 2022 includes: a current sensing signal differentiator circuit 20221, a current sensing signal filter circuit 20222 and a phase number decision circuit 20223. The current sensing signal differentiator circuit 20221 is configured to operably perform differentiation on the current sensing signal VCS to generate a current differentiation signal dVCS. The current sensing signal filter circuit 20222 is configured to operably filter the current sense signal VCS and generate a filtered current signal VCSF according to the current differentiation signal dVCS. The phase number decision circuit 20223 is configured to operably decide, adaptively, a number of the plural power stage circuits 201[1]~201[n] required to be activated according to the filtered current signal VCSF, so as to generate the phase number signal Sphno. In one embodiment, preferably, the phase number decision circuit 20223 is configured to operably perform table lookup on the corresponding filtered current signal VCSF according to relationships of conversion efficiency versus load current with various phase numbers, so as to adaptively decide the number of the plural power stage circuits 201[1]~201[n] required to be activated, thereby generating the phase number signal Sphno. In one embodiment, the aforementioned term "relationships of conversion efficiency versus load current with various phase numbers", as may be used herein, refers to, for example, but not limited to curve diagrams as shown in FIG. 1. A load current range having relatively higher conversion efficiency corresponding to different phase numbers can be derived based upon the aforementioned "relationships of conversion efficiency versus load current with various phase numbers", hence obtaining different phase current thresholds Ith1~Ith(n−1) corresponding to different phase numbers.

The AQR signal generator circuit 2023 is coupled to the operation signal generator circuit 2021. The AQR signal generator circuit 2023 is configured to operably generate the AQR signal Saqr according to the output voltage Vout. The AQR signal generator circuit 2023 includes: a voltage sensing signal differentiator circuit 20231 and plural comparator circuits 20232a and 20232b. The voltage sensing signal differentiator circuit 20231 is configured to operably perform differentiation on a voltage sensing signal VSEN related to the output voltage Vout to generate a voltage differentiation signal dVSEN. The plural comparator circuits 20232a and 20232b are coupled to the voltage sensing signal differentiator circuit 20231. Under this configuration arrangement of the plural comparator circuits 20232a and 20232b, the comparator circuit 20232a is configured to operably compare the voltage differentiation signal dVSEN with an AQR threshold signal Vth1, so as to generate an AQR comparison signal Saqrc1, whereas, the comparator circuit 20232b is configured to operably compare the voltage differentiation signal dVSEN with an AQR threshold signal Vth2, so as to generate an AQR comparison signal Saqrc2. Subsequently, a logic circuit 20233 is configured to operably generate the AQR signal Saqr via the AQR comparison signal Saqrc1 and the AQR comparison signal Saqrc2, for controlling the operation signal generator circuit 2021 to perform an adaptive quick response procedure.

In the adaptive quick response procedure, the operation signal generator circuit 2021 is configured to operably adjust each switch operation signal (i.e., switch operation signal Spwm1, Spwm2 . . . or Spwmn) according to the AQR signal Saqr, so that the plurality of power stage circuits (i.e., power stage circuit 201[1], 201[2], . . . or 201[n]) are controlled to be simultaneously ON for an AQR period. The current sensing signal filter circuit 20222 is configured to operably enable one of a rising signal filter 20222a and a falling signal filter 20222b, of the current sensing signal filter circuit 20222, according to the current differentiation signal dVCS, so as to filter the current sensing signal VCS, thereby generating the filtered current signal VCSF. In one embodiment, the rising signal filter 20222a is different from the falling signal filter 20222b in at least one of following parameters: (1) a bandwidth parameter; (2) a magnitude parameter; and/or (3) a ripple parameter.

In one embodiment, when the current differentiation signal dVCS is greater than zero, the current sensing signal filter circuit 20222 is configured to operably enable the rising signal filter 20222a. In one embodiment, the bandwidth parameter of the rising signal filter 20222a is broader than the bandwidth parameter of the falling signal filter 20222b, such that a bandwidth of the rising signal filter 20222a is broader than a bandwidth of the falling signal filter 20222b. In one embodiment, the current sensing signal filter circuit 20222 includes: a low-pass filter, a band-pass filter or a band-stop filter.

According to the present invention, each power stage circuit (i.e., power stage circuit 201[1], 201[2], . . . or 201[n]) can be implemented as a boost, inverting buck-boost, buck-boost or boost-inverting power stage circuits, configured in synchronous or asynchronous mode, as shown in FIG. 6A to FIG. 6J. It is worthwhile mentioning that, in the present invention, as one having ordinary skill in the art readily appreciates, the term "AQR procedure", as may be used herein, refers to a response procedure that: when a switching regulator 20 operates in a regulation mode, the response procedure will be performed for preventing an unwanted output voltage undershoot due to an abrupt transient of the load current Iload. During an AQR period, the maximum phase number of the power stage circuits are turned ON, while at the same time the AQR period of the response procedure is adaptively adjusted for avoiding the switching regulator staying in the maximum phase number for too long.

Figure 3:
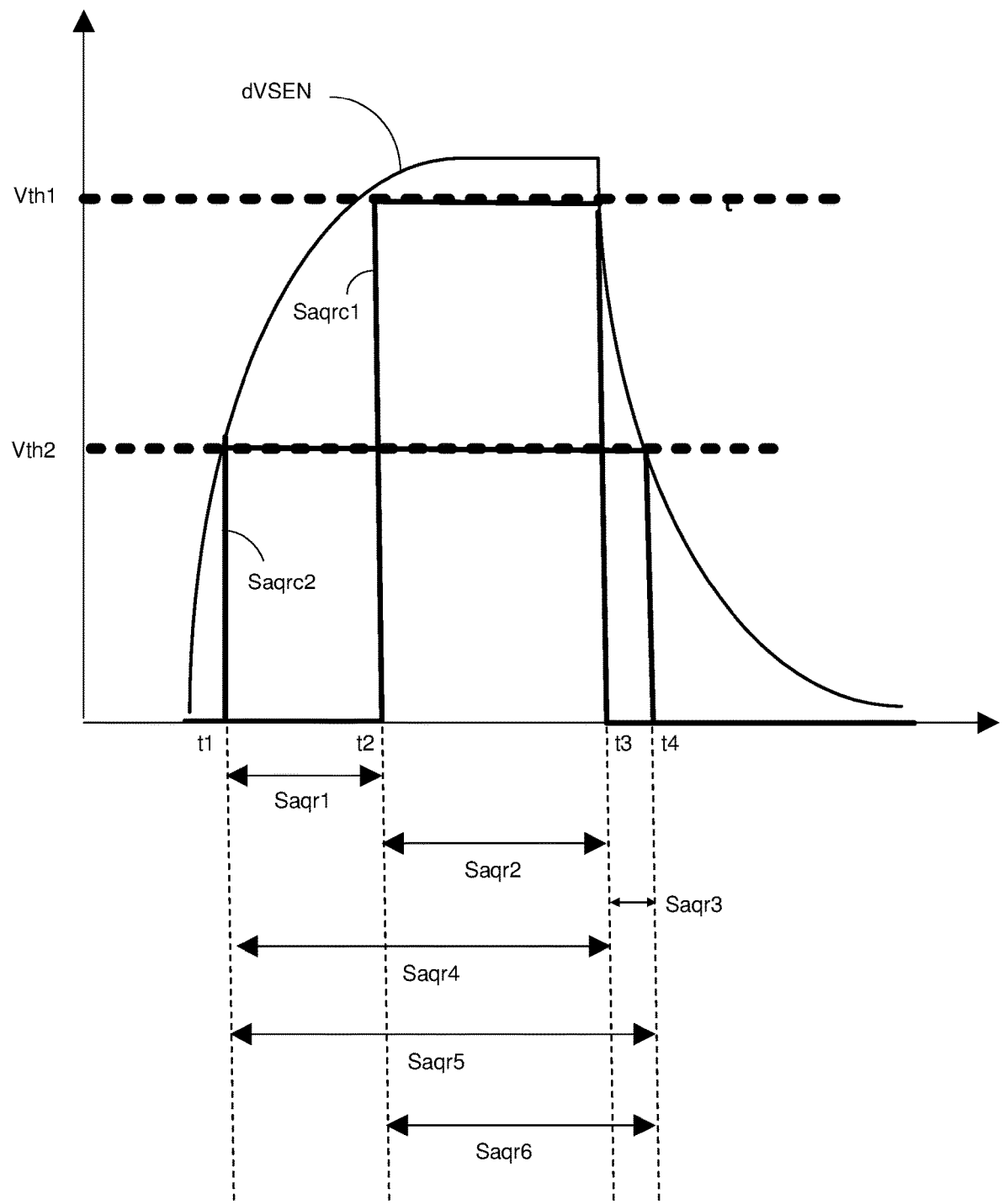
FIG. 3 illustrates signal waveform diagrams depicting a voltage differentiation signal dVSEN and AQR comparison signals Saqrc1 and Saqrc2 associated with the operation of the switching regulator according to an embodiment of the present invention.

FIG. 3 illustrates signal waveform diagrams depicting the voltage differentiation signal dVSEN and AQR comparison signals Saqrc1 and Saqrc2 associated with the operation of a switching regulator according to an embodiment of the present invention. As mentioned above (as shown in FIG. 2), in one embodiment, the comparator circuit 20232a is configured to operably compare the voltage differentiation signal dVSEN with the AQR threshold signal Vth1, so as to generate the AQR comparison signal Saqrc1, whereas, the comparator circuit 20232b is configured to operably compare the voltage differentiation signal dVSEN with the AQR threshold signal Vth2, so as to generate the AQR comparison signal Saqrc2. Consequently, in this circumstance, the accordingly obtained AQR comparison signal Saqrc1 and AQR comparison signal Saqrc2 are configured to operably generate the AQR signal Saqr via the logic circuit 20233 for controlling the operation signal generator circuit 2021 to perform an adaptive quick response procedure. As shown in FIG. 3, the AQR comparison signal Saqrc1 can be switched from a low level to a high level at for example a time point t2 and the AQR comparison signal Saqrc1 can be switched from the high level to the low level at for example a time point t3, whereas, the AQR comparison signal Saqrc2 can be switched from a low level to a high level at for example a time point t1 and the AQR comparison signal Saqrc1 can be switched from the high level to the low level at for example a time point t4.

In one embodiment, please refer to FIG. 2 along with FIG. 3, the logic circuit 20233 can generate the AQR signal Saqr1 in accordance with the AQR comparison signal Saqrc1 and the AQR comparison signal Saqrc2, so as to control the operation signal generator circuit 2021 to perform an adaptive quick response procedure during an time interval from the time point t1 to the time point t2 shown in FIG. 3. That is, as a result, in this case, an AQR period indicates the interval from the time point t1 to the time point t2 shown in FIG. 3. In one embodiment, the logic circuit 20233 can generate the AQR signal Saqr2 in accordance with the AQR comparison signal Saqrc1 and the AQR comparison signal Saqrc2, so as to control the operation signal generator circuit 2021 to perform an adaptive quick response procedure during an interval from the time point t2 to the time point t3 shown in FIG. 3. That is, as a result, in this case, an AQR period indicates the interval from the time point t2 to the time point t3 shown in FIG. 3. In one embodiment, the logic circuit 20233 can generate the AQR signal Saqr3 in accordance with the AQR comparison signal Saqrc1 and the AQR comparison signal Saqrc2, so as to control the operation signal generator circuit 2021 to perform an adaptive quick response procedure during an interval from the time point t3 to the time point t4 shown in FIG. 3. That is, as a result, in this case, an AQR period indicates the interval from the time point t3 to the time point t4 shown in FIG. 3. In one embodiment, the logic circuit 20233 can generate the AQR signal Saqr4 in accordance with the AQR comparison signal Saqrc1 and the AQR comparison signal Saqrc2, so as to control the operation signal generator circuit 2021 to perform an adaptive quick response procedure during an interval from the time point t1 to the time point t3 shown in FIG. 3. That is, as a result, in this case, an AQR period indicates the interval from the time point t1 to the time point t3 shown in FIG. 3. In one embodiment, the logic circuit 20233 can generate the AQR signal Saqr5 in accordance with the AQR comparison signal Saqrc1 and the AQR comparison signal Saqrc2, so as to control the operation signal generator circuit 2021 to perform an adaptive quick response procedure during an interval from the time point t1 to the time point t4 shown in FIG. 3. That is, as a result, in this case, an AQR period indicates the interval from the time point t1 to the time point t4 shown in FIG. 3. In one embodiment, the logic circuit 20233 can generate the AQR signal Saqr6 in accordance with the AQR comparison signal Saqrc1 and the AQR comparison signal Saqrc2, so as to control the operation signal generator circuit 2021 to perform an adaptive quick response procedure during an interval from the time point t2 to the time point t4 shown in FIG. 3. That is, as a result, in this case, an AQR period indicates the interval from the time point t2 to the time point t4 shown in FIG. 3.

It is worthwhile noting that, according to the present invention, it should be understood that two AQR threshold signals Vth1 and Vth2 in the aforementioned preferred embodiment are only illustrative examples, but not for limiting the broadest scope of the present invention. In other embodiments, it is also practicable and within the broadest scope of the present invention that the number of the AQR threshold signal can be more than two. Additionally, it should be understood that the implementation of deciding the four time points (i.e., time points t1, t2, t3 and t4) through comparing differentiation signal dVSEN with different AQR threshold signals in the above-mentioned preferred embodiment is only an illustrative example, but not for limiting the broadest scope of the present invention. In other embodiments, it is also practicable and within the broadest scope of the present invention that the number of the time point can be any other value. As exemplified by the embodiment shown in FIG. 3, in a case where six AQR signals Saqr1~Saqr6 are available for use, a user can decide which AQR signals among the aforementioned six AQR signals Saqr1~Saqr6 to be used, depending upon the requirement of the entire circuitry.

Figure 4:
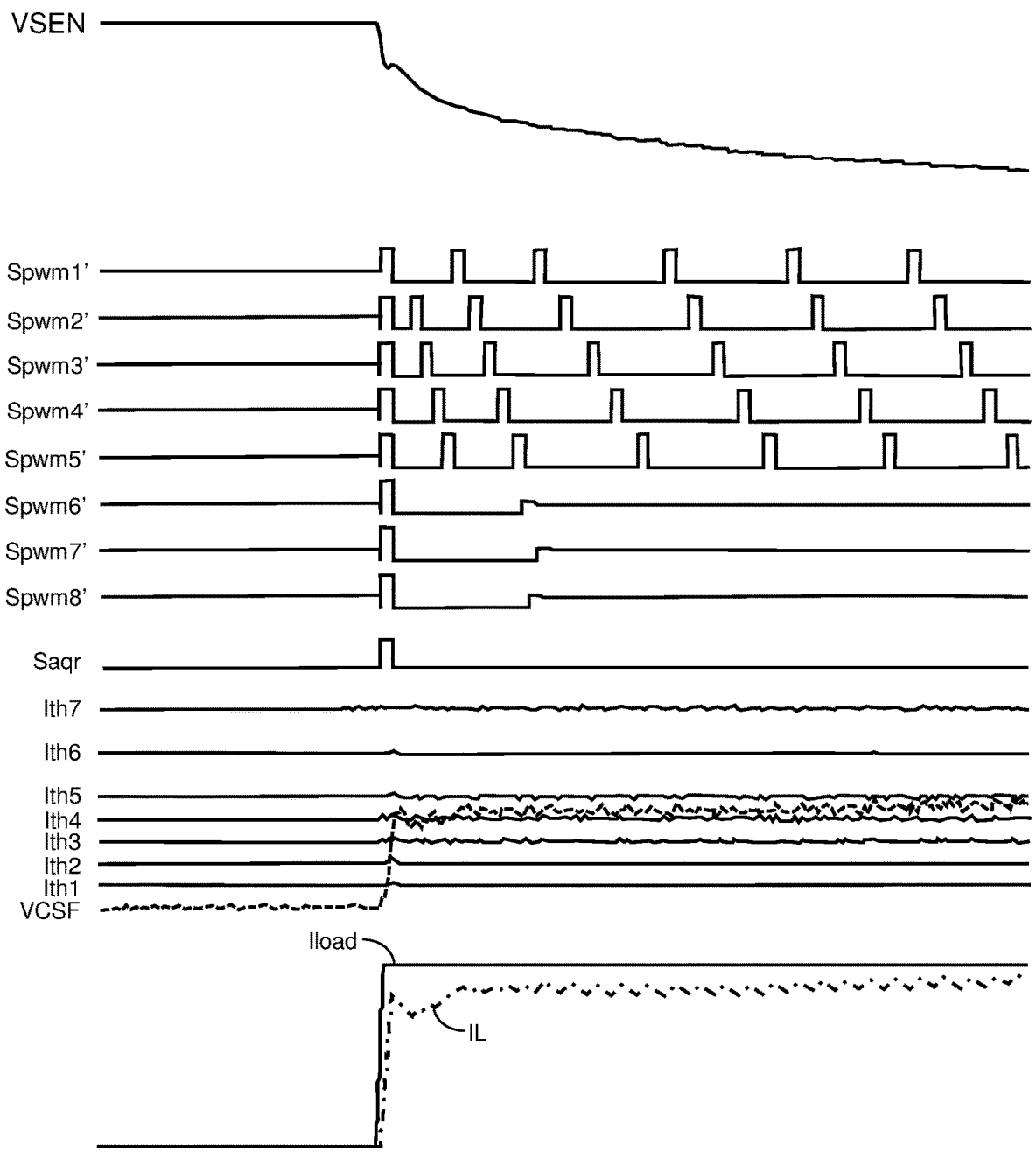
FIG. 4 illustrates signal waveform diagrams depicting signals associated with the operation of a switching regulator according to an embodiment of the present invention.

FIG. 4 illustrates signal waveform diagrams depicting signals associated with the operation of a switching regulator according to an embodiment of the present invention. A voltage sensing signal VSEN, control signals Spwm1'~Spwm8', an AQR signal Saqr, phase current thresholds Ith1~Ith7, a filtered current signal VCSF, a load current Iload and an inductor current IL are depicted and shown in FIG. 4. As shown in FIG. 4, because an enabling level of the filtered current signal VCSF is roughly higher than a level of the phase current thresholds Ith4, in this embodiment, the phase number of the multiphase switching regulator is equal to 5. That is, in this case, when the AQR period (i.e., during a period where the AQR signal Saqr is enabled) has already finished, five power stage circuits of the multiphase switching regulator can be turned ON with interleaving manner.

Figure 5:
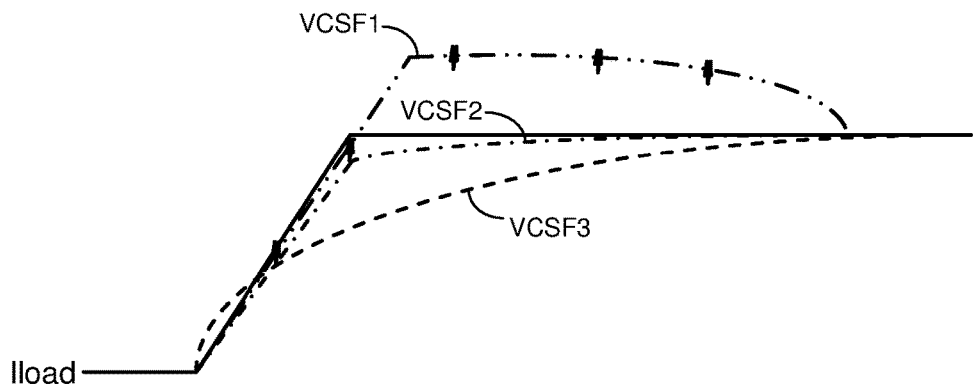
FIG. 5 illustrates signal waveform diagrams depicting a load current and different filtered current signals generated by a current sensing signal filter circuit under different bandwidth parameters according to an embodiment of the present invention.
Figure 6A:
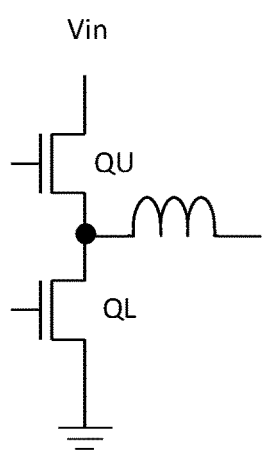
FIG. 6A to FIG. 6J show synchronous and asynchronous buck, boost, inverting buck-boost, buck-boost and boost-inverting power stage circuits, respectively.
Figure 6B:
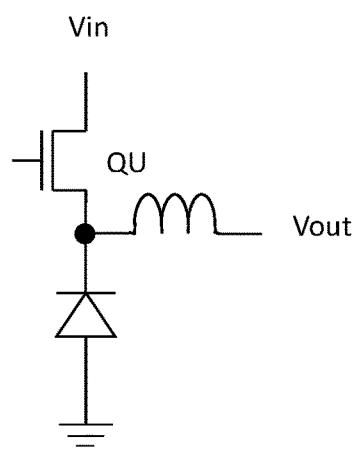
Figure 6C:
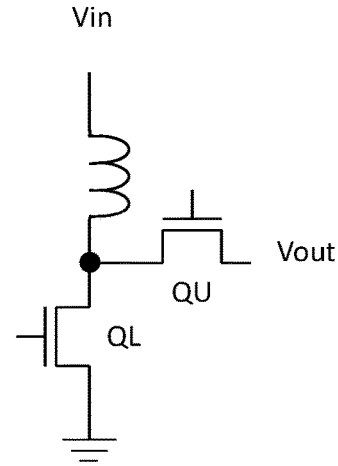
Figure 6D:
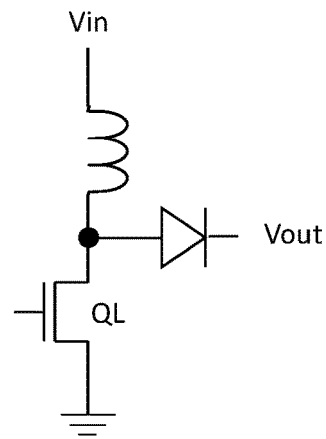
Figure 6E:
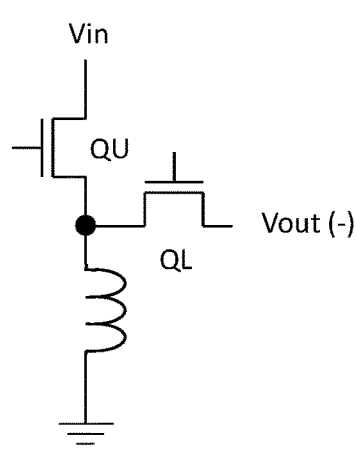
Figure 6F:
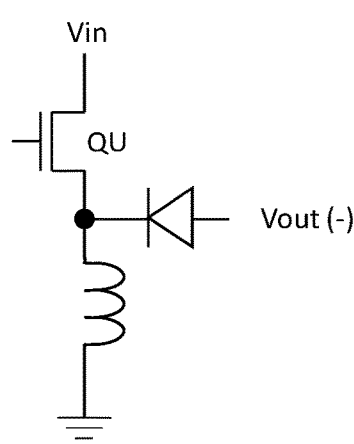
Figure 6G:
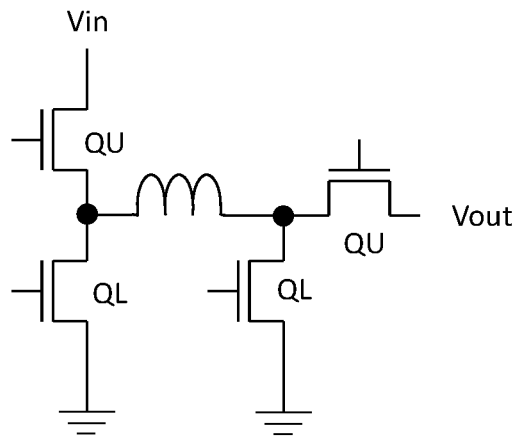
Figure 6H:
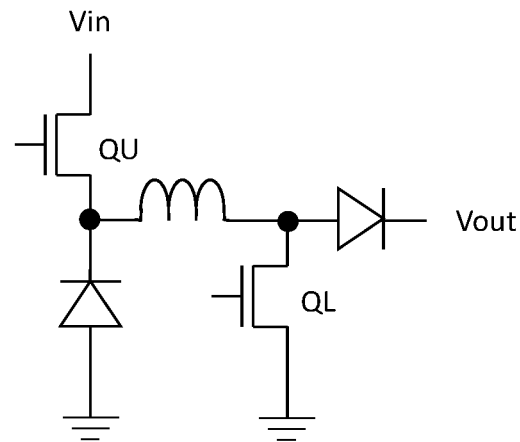
Figure 6I:
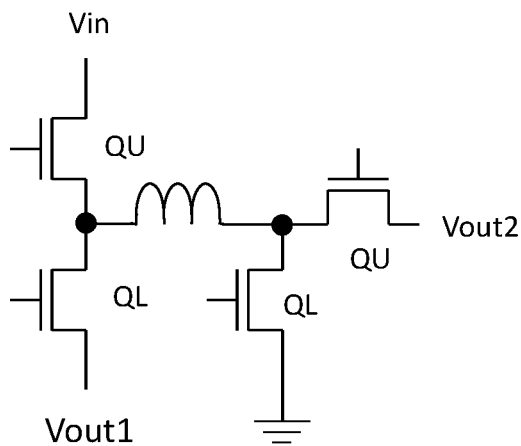
Figure 6J:
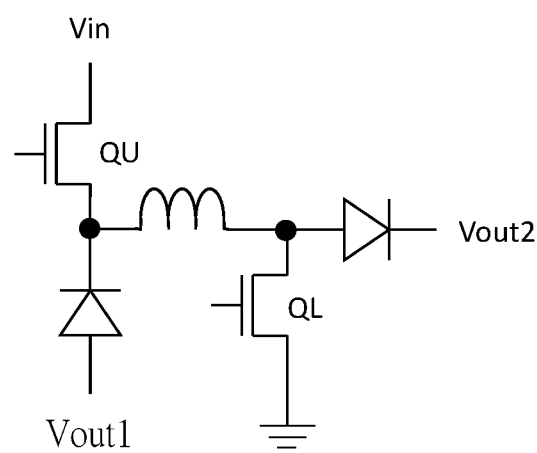

FIG. 5 illustrates signal waveform diagrams depicting a load current and different filtered current signals generated by a current sensing signal filter circuit under different bandwidth parameters according to an embodiment of the present invention. Please refer to FIG. 5 along with FIG. 2. When a bandwidth parameter of the current sensing signal filter circuit 20222 is too broad, an undesirable overshoot and an unwanted noise will emerge in a filtered current signal VCSF (e.g., as shown by a filtered current signal VCSF1 in FIG. 5). On the contrary, when a bandwidth parameter of the current sensing signal filter circuit 20222 is too narrow, it will become too slow for a filtered current signal VCSF (e.g., as shown by a filtered current signal VCSF3 in FIG. 5) to reach a corresponding target value. Fortunately and desirably, when a bandwidth parameter of the current sensing signal filter circuit 20222 is a preferred value, a filtered current signal VCSF (e.g., as shown by a filtered current signal VCSF2 in FIG. 5) will swiftly reach a corresponding target value, without an unpleasant and unwanted noise.

Figure 7:
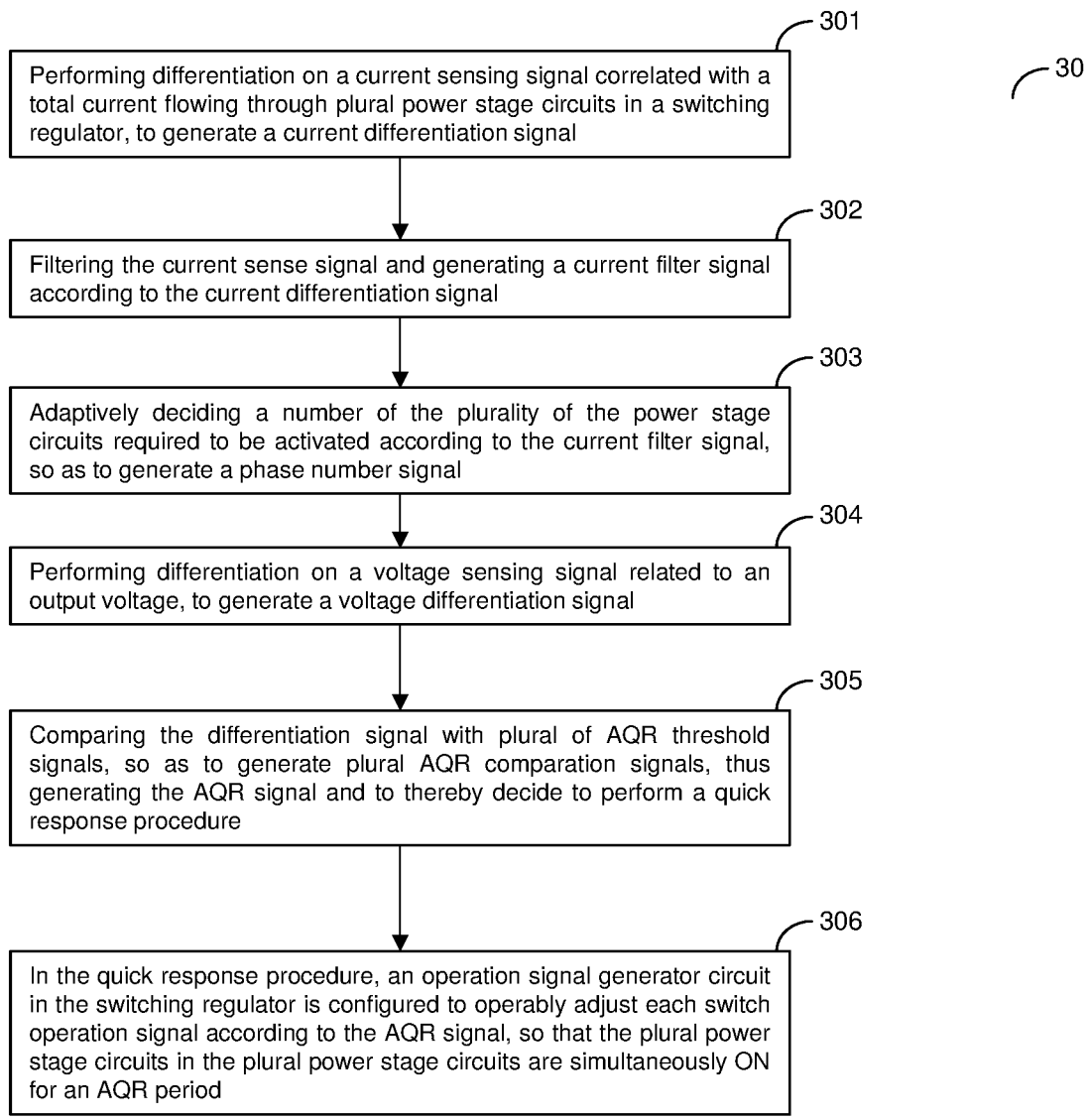
FIG. 7 shows a flow chart diagram of a quick response method according to an embodiment of the present invention.

FIG. 7 shows a flow chart diagram of a quick response method according to an embodiment of the present invention. As shown in FIG. 7, the quick response method 30 of the present invention comprises the following steps. Step 301 includes: performing differentiation on a current sensing signal correlated with a total current flowing through plural power stage circuits of a switching regulator to generate a current differentiation signal. Subsequently, step 302 includes: filtering the current sense signal and generating a filtered current signal according to the current differentiation signal. Subsequently, step 303 includes: adaptively deciding a number of the plurality of power stage circuits required to be activated according to the filtered current signal, so as to generate a phase number signal. Subsequently, step 304 includes: performing differentiation on a voltage sensing signal related to an output voltage to generate the voltage differentiation signal. Subsequently, step 305 includes: comparing the voltage differentiation signal with plural of AQR threshold signals, so as to generate plural AQR comparison signals, thus generating the AQR signal and thereby deciding to perform an adaptive quick response procedure. Subsequently, step 306 includes: in the adaptive quick response procedure, an operation signal generator circuit in the switching regulator is configured to operably adjust each switch operation signal according to the AQR signal, so that the plural power stage circuits are controlled to be simultaneously ON for an AQR period.

Figure 8:
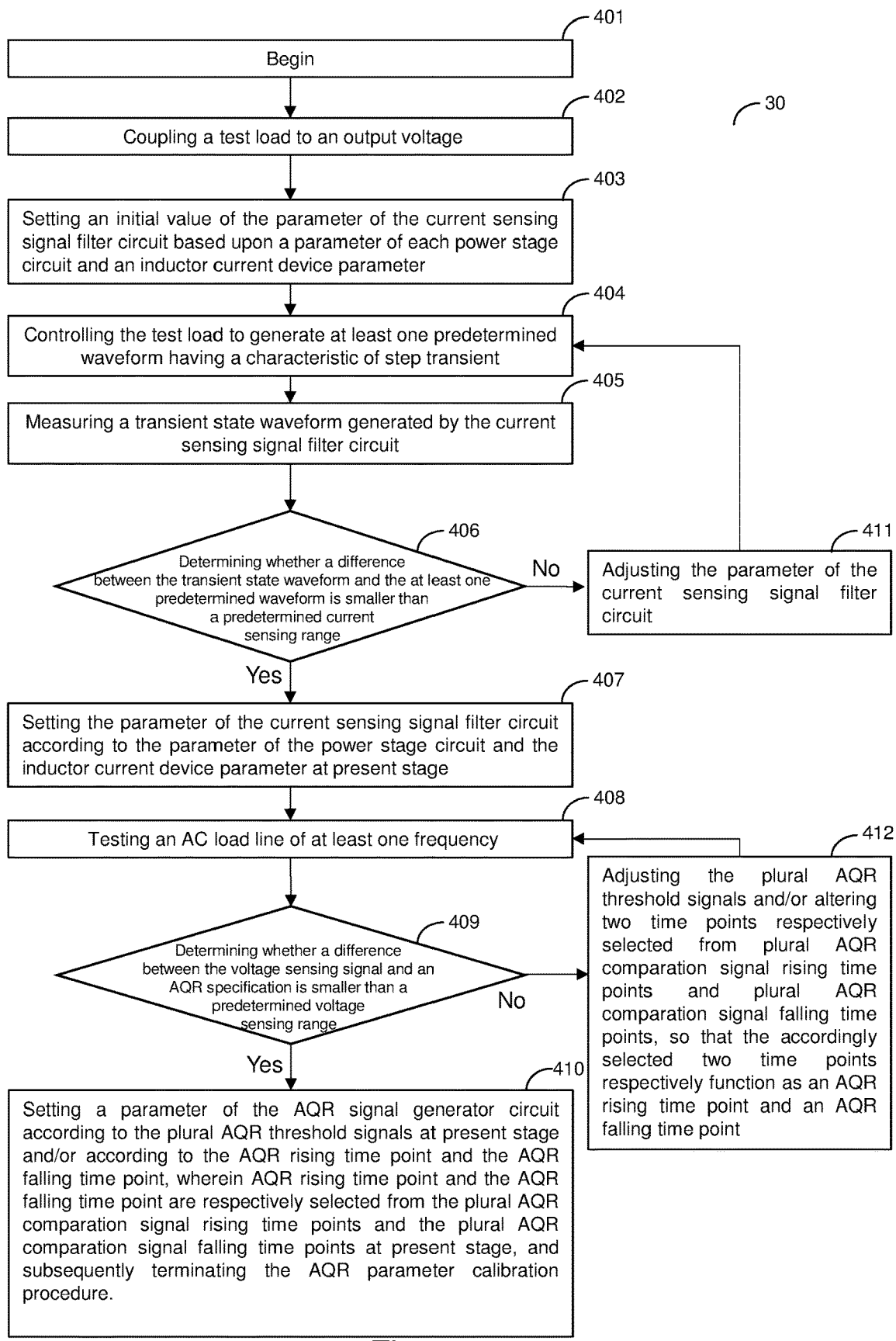
FIG. 8 shows a flow chart diagram depicting a filter parameter calibration procedure and an AQR parameter calibration procedure in a quick response method according to an embodiment of the present invention.

FIG. 8 shows a flow chart diagram depicting a filter parameter calibration procedure and an AQR parameter calibration procedure in a quick response method according to an embodiment of the present invention. As shown in FIG. 8, the quick response method 30 of the present invention further comprises: a filter parameter calibration procedure and an AQR parameter calibration procedure. Firstly, the filter parameter calibration procedure starts in step 401. Subsequently, step 402 includes: coupling a test load to an output voltage. Subsequently, step 403 includes: setting an initial value of the parameter of the current sensing signal filter circuit based upon a parameter of the power stage circuit and an inductor current device parameter. Subsequently, step 404 includes: controlling the test load to generate at least one predetermined waveform having a characteristic of step transient. Subsequently, step 405 includes: measuring a transient state waveform generated by the current sensing signal filter circuit.

Subsequently, step 406 includes: determining whether a difference between the transient state waveform and the at least one predetermined waveform is smaller than a predetermined current sensing range. If it is determined that a result of the step 406 is yes, step 407 is proceeded, or otherwise step 411 is proceeded. Step 407 includes: setting the parameter of the current sensing signal filter circuit according to the parameter of the power stage circuit and the inductor current device parameter at present time, and proceeding to step 408. Step 411 includes: adjusting the parameter of the current sensing signal filter circuit and returning to the step 404. Step 408, in which the AQR parameter calibration procedure is initiated and activated, includes: testing an AC load line of at least one frequency. Subsequently, step 409 includes: determining whether a difference between the voltage sensing signal and an AQR specification is smaller than a predetermined voltage sensing range. If it is determined that a result of the step 409 is yes, step 410 is proceeded, or otherwise step 412 is proceeded. Step 410 includes: setting a parameter of the AQR signal generator circuit according to the plural AQR threshold signals and/or the AQR rising time point and the AQR falling time point, and subsequently terminating the AQR parameter calibration procedure, wherein the AQR rising time point and the AQR falling time point are respectively selected from the plural AQR comparison signal rising time points and the plural AQR comparison signal falling time points at present time. Step 412 includes: adjusting the plural AQR threshold signals and/or updating two time points respectively selected from plural AQR comparison signal rising time points and plural AQR comparison signal falling time points, so that the updated two time points respectively function as an AQR rising time point and an AQR falling time point, and returning to the step 408.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-tovoltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A switching regulator, comprising:
    a plurality of power stage circuits, wherein each power stage circuit includes at least one power switch and is configured to operably operate the at least one power switch in accordance with a corresponding switch operation signal, so as to convert an input voltage to an output voltage; and
    a control circuit, including:
        an operation signal generator circuit, which is coupled to the plurality of power stage circuits, wherein the operation signal generator circuit is configured to operably generate the switch operation signal according to the output voltage, a phase number signal and an adaptive quick response (AQR) signal;
    a phase number signal generator circuit, which is coupled to the operation signal generator circuit, wherein the phase number signal generator circuit is configured to operably generate the phase number signal based upon a current sensing signal correlated with a total current flowing through the plurality of power stage circuits, wherein the phase number signal generator circuit includes:
        a current sensing signal differentiator circuit, which is configured to operably perform differentiation on the current sensing signal to generate a current differentiation signal;
        a current sensing signal filter circuit, which is configured to operably filter the current sense signal to generate a filtered current signal according to the current differentiation signal; and
        a phase number decision circuit, which is configured to operably decide, adaptively, a number of the plurality of power stage circuits required to be activated according to the filtered current signal, so as to generate the phase number signal; and
    an AQR (adaptive quick response) signal generator circuit, which is coupled to the operation signal generator circuit, wherein the AQR signal generator circuit is configured to operably generate the AQR signal according to the output voltage, wherein the AQR signal generator circuit includes:
        a voltage sensing signal differentiator circuit, which is configured to operably perform differentiation on a voltage sensing signal related to the output voltage to generate a voltage differentiation signal; and
        a plurality of comparator circuits, which are coupled to the voltage sensing signal differentiator circuit, wherein the plurality of comparator circuits are configured to operably compare the voltage differentiation signal with a plurality of AQR threshold signals, so as to generate a plurality of AQR comparison signals, thus generating the AQR signal for controlling the operation signal generator circuit to perform an adaptive quick response procedure.

2. The switching regulator as claimed in claim 1, wherein in the adaptive quick response procedure, the operation signal generator circuit is configured to operably adjust each switch operation signal according to the AQR signal, so that the plurality of power stage circuits are controlled to be simultaneously ON for an AQR period.

3. The switching regulator as claimed in claim 1, wherein the current sensing signal filter circuit is configured to operably enable one of a rising signal filter and a falling signal filter, of the current sensing signal filter circuit, according to the current differentiation signal, so as to filter the current sensing signal, thereby generating the filtered current signal, wherein the rising signal filter is different from the falling signal filter in at least one of following parameters:
    (1) a bandwidth parameter;
    (2) a magnitude parameter; and/or
    (3) a ripple parameter.

4. The switching regulator as claimed in claim 3, wherein when the current differentiation signal is greater than zero, the current sensing signal filter circuit enables the rising signal filter, wherein the bandwidth parameter of the rising signal filter is broader than the bandwidth parameter of the falling signal filter, such that a bandwidth of the rising signal filter is broader than a bandwidth of the falling signal filter.

5. The switching regulator as claimed in claim 1, wherein the current sensing signal filter circuit is configured to operably decide a parameter of the current sensing signal filter circuit in accordance with a filter parameter calibration procedure, wherein the filter parameter calibration procedure includes following steps:
    step (1): coupling a test load to the output voltage;
    step (2): subsequent to the step (1), setting an initial value of the parameter of the current sensing signal filter circuit based upon a parameter of the power stage circuit and an inductor current device parameter, wherein the parameter of the power stage circuit includes: a parameter of a device in the power stage circuit, and wherein the inductor current device parameter includes: a parameter of a device in an inductor current sensing circuit, which is configured to operably sense an inductor current flowing through the power stage circuit;
    step (3): subsequent to the step (2) or step (6), controlling the test load to generate at least one predetermined waveform having a characteristic of step transient;
    step (4): subsequent to the step (3), measuring a transient state waveform generated by the current sensing signal filter circuit;
    step (5): subsequent to the step (4), determining whether a difference between the transient state waveform and the at least one predetermined waveform is smaller than a predetermined current sensing range;
    the step (6): subsequent to the step (5), when the difference between the transient state waveform and the at least one predetermined waveform is not smaller than the predetermined current sensing range, adjusting the parameter of the current sensing signal filter circuit and returning to the step (3); and
    step (7): subsequent to the step (5), when the difference between the transient state waveform and the at least one predetermined waveform is smaller than the predetermined current sensing range, setting the parameter of the current sensing signal filter circuit according to the parameter of the power stage circuit and the inductor current device parameter at present time.

6. The switching regulator as claimed in claim 5, wherein the AQR signal generator circuit is configured to operably decide a parameter of the AQR signal generator circuit in accordance with an AQR parameter calibration procedure, wherein the AQR parameter calibration procedure includes following steps:
step (8): subsequent to the step (7) or step (10), testing an AC load line of at least one frequency;
step (9): subsequent to the step (8), determining whether a difference between the voltage sensing signal and an AQR specification is smaller than a predetermined voltage sensing range;
the step (10): subsequent to the step (9), when the difference between the voltage sensing signal and the AQR specification is not smaller than the predetermined voltage sensing range, adjusting the plurality of AQR threshold signals and/or updating two time points respectively selected from a plurality of AQR comparison signal rising time points and a plurality of AQR comparison signal falling time points, so that the updated two time points respectively function as an AQR rising time point and an AQR falling time point and returning to the step (8); and
step (11): subsequent to the step (9), when the difference between the voltage sensing signal and the AQR specification is smaller than the predetermined voltage sensing range, setting a parameter of the AQR signal generator circuit via the plurality of AQR threshold signals at present time and/or via the AQR rising time point and the AQR falling time point, both of which are respectively selected from the plurality of AQR comparison signal rising time points and the plurality of AQR comparison signal falling time points at present time, and subsequently terminating the AQR parameter calibration procedure.

7. The switching regulator as claimed in claim 1, wherein the phase number decision circuit is configured to operably perform table lookup on a corresponding filtered current signal according to relationships of conversion efficiency versus load current with various phase numbers, so as to adaptively decide the number of the plurality of power stage circuits required to be activated, thereby generating the phase number signal.

8. The switching regulator as claimed in claim 1, wherein the current sensing signal filter circuit includes: a low-pass filter, a band-pass filter or a band-stop filter.

9. A control circuit for use in a switching regulator, wherein the control circuit is configured to operably convert an input voltage to an output voltage; the control circuit comprising:
an operation signal generator circuit, which is coupled to a plurality of power stage circuits, wherein the operation signal generator circuit is configured to operably generate a switch operation signal according to the output voltage, a phase number signal and an adaptive quick response (AQR) signal;
a phase number signal generator circuit, which is coupled to the operation signal generator circuit, wherein the phase number signal generator circuit is configured to operably generate the phase number signal based upon a current sensing signal correlated with a total current flowing through the plurality of power stage circuits, wherein the phase number signal generator circuit includes:
  a current sensing signal differentiator circuit, which is configured to operably perform differentiation on the current sensing signal to generate a current differentiation signal;
  a current sensing signal filter circuit, which is configured to operably filter the current sense signal to generate a filtered current signal according to the current differentiation signal; and
  a phase number decision circuit, which is configured to operably decide, adaptively, a number of the plurality of power stage circuits required to be activated according to the filtered current signal, so as to generate the phase number signal; and
an AQR (adaptive quick response) signal generator circuit, which is coupled to the operation signal generator circuit, wherein the AQR signal generator circuit is configured to operably generate the AQR signal according to the output voltage, wherein the AQR signal generator circuit includes:
  a voltage sensing signal differentiator circuit, which is configured to operably perform differentiation on a voltage sensing signal related to the output voltage to generate a voltage differentiation signal; and
  a plurality of comparator circuits, which are coupled to the voltage sensing signal differentiator circuit, wherein the plurality of comparator circuits are configured to operably compare the voltage differentiation signal with a plurality of AQR threshold signals, so as to generate a plurality of AQR comparison signals, thus generating the AQR signal for controlling the operation signal generator circuit to perform an adaptive quick response procedure.

10. The control circuit as claimed in claim 9, wherein in the adaptive quick response procedure, the operation signal generator circuit is configured to operably adjust each switch operation signal according to the AQR signal, so that the plurality of power stage circuits are controlled to be simultaneously ON for an AQR period.

11. The control circuit as claimed in claim 9, wherein the current sensing signal filter circuit is configured to operably enable one of a rising signal filter and a falling signal filter, of the current sensing signal filter circuit, according to the current differentiation signal, so as to filter the current sensing signal, thereby generating the filtered current signal, wherein the rising signal filter is different from the falling signal filter in at least one of following parameters:
(1) a bandwidth parameter;
(2) a magnitude parameter; and/or
(3) a ripple parameter.

12. The control circuit as claimed in claim 11, wherein when the current differentiation signal is greater than zero, the current sensing signal filter circuit enables the rising signal filter, wherein the bandwidth parameter of the rising signal filter is broader than the bandwidth parameter of the falling signal filter, such that a bandwidth of the rising signal filter is broader than a bandwidth of the falling signal filter.

13. The control circuit as claimed in claim 9, wherein the current sensing signal filter circuit is configured to operably decide a parameter of the current sensing signal filter circuit in accordance with a filter parameter calibration procedure, wherein the filter parameter calibration procedure includes following steps:
step (1): coupling a test load to the output voltage;
step (2): subsequent to the step (1), setting an initial value of the parameter of the current sensing signal filter circuit based upon a parameter of the power stage circuit and an inductor current device parameter, wherein the parameter of the power stage circuit includes: a parameter of a device in the power stage circuit, and wherein the inductor current device parameter includes: a parameter of a device in an inductor current sensing circuit, which is configured to operably sense an inductor current flowing through the power stage circuit;

step (3): subsequent to the step (2) or step (6), controlling the test load to generate at least one predetermined waveform having a characteristic of step transient;

step (4): subsequent to the step (3), measuring a transient state waveform generated by the current sensing signal filter circuit;

step (5): subsequent to the step (4), determining whether a difference between the transient state waveform and the at least one predetermined waveform is smaller than a predetermined current sensing range;

the step (6): subsequent to the step (5), when the difference between the transient state waveform and the at least one predetermined waveform is not smaller than the predetermined current sensing range, adjusting the parameter of the current sensing signal filter circuit and returning to the step (3); and step (7): subsequent to the step (5), when the difference between the transient state waveform and the at least one predetermined waveform is smaller than the predetermined current sensing range, setting the parameter of the current sensing signal filter circuit according to the parameter of the power stage circuit and the inductor current device parameter at present time.

14. The control circuit as claimed in claim 13, wherein the AQR signal generator circuit is configured to operably decide a parameter of the AQR signal generator circuit in accordance with an AQR parameter calibration procedure, wherein the AQR parameter calibration procedure includes following steps:

step (8): subsequent to the step (7) or step (10), testing an AC load line of at least one frequency;

step (9): subsequent to the step (8), determining whether a difference between the voltage sensing signal and an AQR specification is smaller than a predetermined voltage sensing range;

the step (10): subsequent to the step (9), when the difference between the voltage sensing signal and the AQR specification is not smaller than the predetermined voltage sensing range, adjusting the plurality of AQR threshold signals and/or updating two time points respectively selected from a plurality of AQR comparison signal rising time points and a plurality of AQR comparison signal falling time points, so that the updated two time points respectively function as an AQR rising time point and an AQR falling time point and returning to the step (8); and step (11): subsequent to the step (9), when the difference between the voltage sensing signal and the AQR specification is smaller than the predetermined voltage sensing range, setting a parameter of the AQR signal generator circuit at present time via the plurality of AQR threshold signals at present time and/or via the AQR rising time point and the AQR falling time point, both of which are respectively selected from the plurality of AQR comparison signal rising time points and the plurality of AQR comparison signal falling time points at present time, and subsequently terminating the AQR parameter calibration procedure.

15. The control circuit as claimed in claim 9, wherein the phase number decision circuit is configured to operably perform table lookup on a corresponding filtered current signal according to relationships of conversion efficiency versus load current with various phase numbers, so as to adaptively decide the number of the plurality of power stage circuits required to be activated, thereby generating the phase number signal.

16. The control circuit as claimed in claim 9, wherein the current sensing signal filter circuit includes: a low-pass filter, a band-pass filter or a band-stop filter.

17. A quick response method for use in a switching regulator, wherein the quick response method is configured to operably enhance response capability for instant change of a load; the quick response method comprising following steps:

performing differentiation on a current sensing signal correlated with a total current flowing through a plurality of power stage circuits in the switching regulator to generate a current differentiation signal;

filtering the current sense signal and generating a filtered current signal according to the current differentiation signal;

adaptively deciding a number of the plurality of power stage circuits required to be activated according to the filtered current signal, so as to generate a phase number signal;

performing differentiation on a voltage sensing signal related to an output voltage to generate a voltage differentiation signal;

comparing the voltage differentiation signal with a plurality of adaptive quick response (AQR) threshold signals, so as to generate a plurality of AQR comparison signals, thus generating the AQR signal for triggering an adaptive quick response procedure; and in the adaptive quick response procedure, an operation signal generator circuit in the switching regulator is configured to operably adjust each switch operation signal according to the AQR signal, so that the plurality of power stage circuits are controlled to be simultaneously ON for an AQR period.

18. The quick response method as claimed in claim 17, further comprising following steps:

enabling one of a rising signal filter and a falling signal filter, of a current sensing signal filter circuit, according to the current differentiation signal, so as to filter the current sensing signal, thereby generating the filtered current signal, wherein the rising signal filter is different from the falling signal filter in at least one of following parameters:

(1) a bandwidth parameter;
(2) a magnitude parameter; and/or
(3) a ripple parameter.

19. The quick response method as claimed in claim 18, further comprising following steps:

when the current differentiation signal is greater than zero, enabling the rising signal filter, wherein the bandwidth parameter of the rising signal filter is broader than the bandwidth parameter of the falling signal filter, such that a bandwidth of the rising signal filter is broader than a bandwidth of the falling signal filter.

20. The quick response method as claimed in claim 17, further comprising following steps:

deciding a parameter of a current sensing signal filter circuit in the switching regulator in accordance with a filter parameter calibration procedure, wherein the filter parameter calibration procedure includes following steps:

step (1): coupling a test load to the output voltage;

step (2): subsequent to the step (1), setting an initial value of the parameter of the current sensing signal filter circuit based upon a parameter of the power stage circuit and an inductor current device parameter, wherein the parameter of the power stage circuit includes: a parameter of a device in the power stage circuit, and wherein the inductor current device parameter includes: a parameter of a device in an inductor current sensing circuit, which is configured to operably sense an inductor current flowing through the power stage circuit;

step (3): subsequent to the step (2) or step (6), controlling the test load to generate at least one predetermined waveform having a characteristic of step transient;

step (4): subsequent to the step (3), measuring a transient state waveform generated by the current sensing signal filter circuit;

step (5): subsequent to the step (4), determining whether a difference between the transient state waveform and the at least one predetermined waveform is smaller than a predetermined current sensing range;

the step (6): subsequent to the step (5), when the difference between the transient state waveform and the at least one predetermined waveform is not smaller than the predetermined current sensing range, adjusting the parameter of the current sensing signal filter circuit and returning to the step (3); and step (7): subsequent to the step (5), when the difference between the transient state waveform and the at least one predetermined waveform is smaller than the predetermined current sensing range, setting the parameter of the current sensing signal filter circuit according to the parameter of the power stage circuit and the inductor current device parameter at present time.

21. The quick response method as claimed in claim 20, further comprising following steps:

deciding a parameter of an AQR signal generator circuit in the switching regulator in accordance with an AQR parameter calibration procedure, wherein the AQR parameter calibration procedure includes following steps:

step (8): subsequent to the step (7) or step (10), testing an AC load line of at least one frequency;

step (9): subsequent to the step (8), determining whether a difference between the voltage sensing signal and an AQR specification is smaller than a predetermined voltage sensing range;

the step (10): subsequent to the step (9), when the difference between the voltage sensing signal and the AQR specification is not smaller than the predetermined voltage sensing range, adjusting the plurality of AQR threshold signals and/or updating two time points respectively selected from a plurality of AQR comparison signal rising time points and a plurality of AQR comparison signal falling time points, so that the updated two time points respectively function as an AQR rising time point and an AQR falling time point and returning to the step (8); and step (11): subsequent to the step (9), when the difference between the voltage sensing signal and the AQR specification is smaller than the predetermined voltage sensing range, setting a parameter of the AQR signal generator circuit via the plurality of AQR threshold signals at present time and/or via the AQR rising time point and the AQR falling time point, both of which are respectively selected from the plurality of AQR comparison signal rising time points and the plurality of AQR comparison signal falling time points at present time, and subsequently terminating the AQR parameter calibration procedure.

22. The quick response method as claimed in claim 17, further comprising following steps:

performing table lookup on a corresponding filtered current signal according to relationships of conversion efficiency versus load current with various phase numbers, so as to adaptively decide the number of the plurality of power stage circuits required to be activated, thereby generating the phase number signal.

* * * * *